Aug. 5, 1969

G. J. E. GUILLEMIN  3,460,029

MAGNETOMETER INCORPORATING PROBE IN THE FORM OF A SATURABLE
FERROMAGNETIC CORE SUBJECTED TO THE MAGNETIC FIELD TO BE
MEASURED AND TO AN AUXILIARY EXCITING ALTERNATING FIELD

Filed Dec. 18, 1964  3 Sheets-Sheet 1

Inventor
Germain Joseph Edmond Guillemin
by Pierce, Scheffler & Parker
attys

Aug. 5, 1969    G. J. E. GUILLEMIN    3,460,029
MAGNETOMETER INCORPORATING PROBE IN THE FORM OF A SATURABLE
FERROMAGNETIC CORE SUBJECTED TO THE MAGNETIC FIELD TO BE
MEASURED AND TO AN AUXILIARY EXCITING ALTERNATING FIELD
Filed Dec. 18, 1964    3 Sheets-Sheet 2
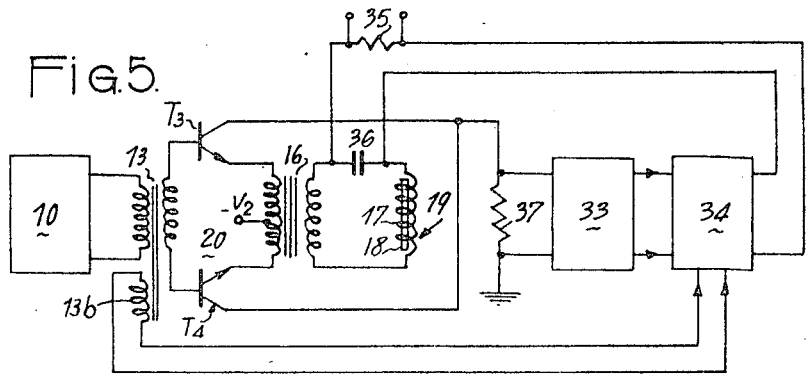
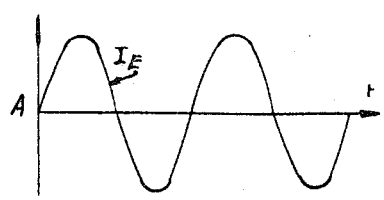
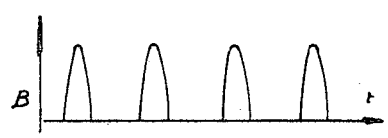
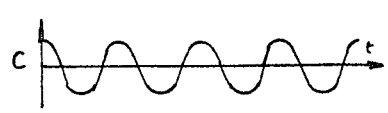
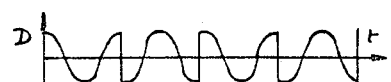
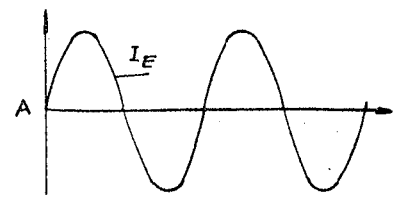
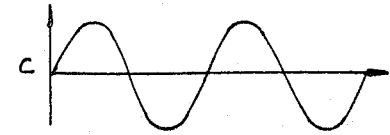
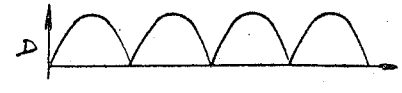
Fig.6.    Fig.7.
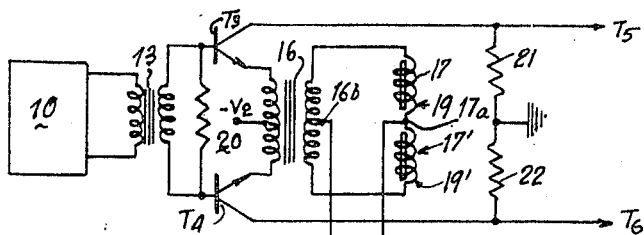
Fig.4.
Inventor
Germain Joseph Edmond Guillemin
by Pierce, Scheffler & Parker
attys

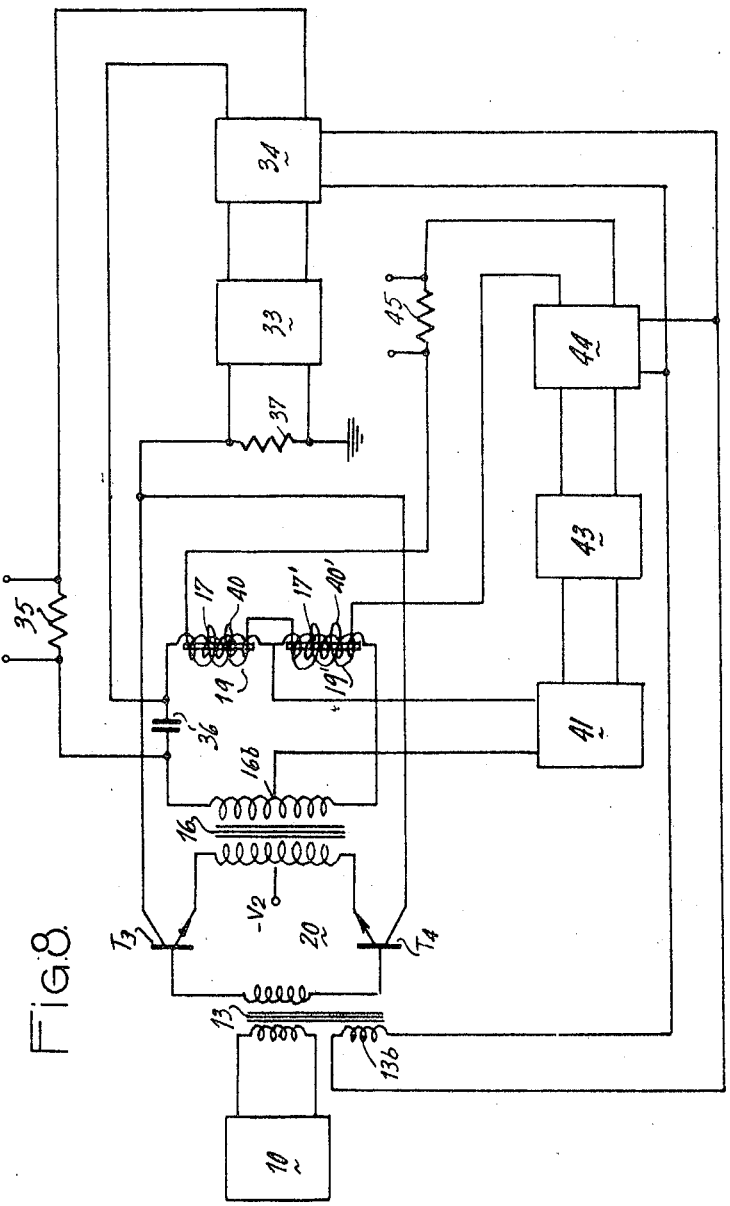

3,460,029
MAGNETOMETER INCORPORATING PROBE IN THE FORM OF A SATURABLE FERROMAGNETIC CORE SUBJECTED TO THE MAGNETIC FIELD TO BE MEASURED AND TO AN AUXILIARY EXCITING ALTERNATING FIELD
Germain Joseph Edmond Guillemin, Bagneux, Hauts-de-Seine, assignor to Compagnie des Compteurs, Paris, France, a company of France
Filed Dec. 18, 1964, Ser. No. 419,520
Claims priority, application France, Dec. 31, 1963, 958,950
Int. Cl. G01r 33/02
U.S. Cl. 324—43    7 Claims

ABSTRACT OF THE DISCLOSURE

Magnetometer including a probe constituted by a saturable ferromagnetic core disposed within a single winding, said probe being, on the one hand, connected to an exciting alternating current generator and, on the other hand, to a measuring circuit, this magnetometer being characterized in that said probe winding is connected to the recited generator through an impedance matching amplifier having a very low internal impedance whereby the core is cyclically saturated by the exciting alternating current, and in that the measuring circuit supplies at its output terminals a differential voltage proportional to the difference between the saturating currents produced in the winding of the probe at each alteration of the excitation current.

---

The present invention relates to apparatus for measuring magnetic fields, using as a sensitive element a saturable core submitted to the influence of the field to be measured and to an auxiliary exciting alternating field.

Most of the known type magnetometers are grounded upon the detection of even harmonics, particularly the second harmonic of the frequency of an exciting alternating field, said harmonics originating at the magnetic material saturation of the probe owing to the action of the exciting alternating field and of the field to be measured. To this end, there is used either a single magnetic core of which the exciting winding is connected to a filter followed by a phase detecting circuit, or two parallel cores the respective windings of which are fed in a 180° phase relationship in a bridge circuit.

The former of the above arrangements does not give very satisfactory results, owing to the nature of the involved circuit. The latter solution, which is most commonly used, gives acceptable results, but it requires a thorough balancing of the elements comprising the arms of the bridge.

The present invention has for its object a magnetometer which is not based upon the specific detection of the even harmonics of the exciting field frequency, but which uses in a balanced circuit the direct comparison of the saturation currents which appear in a single magnetic core for each half-cycle of the exciting frequency.

The magnetometer according to this invention includes an A.C. generator producing exciting oscillations substantially at audio frequency, a first transformer having its primary winding connected to the generator, a symmetric impedance matching circuit having at least two transistors having their bases connected respectively to the secondary winding of the transformer so that the transistors are symmetrically biased in dependence upon each half-cycle of the exciting oscillations, a second transformer having its primary winding connected to the emitters of both transistors whereby successive current pulses corresponding to the exciting oscillations are applied to the second transformer, a probe of magnetic material having an exciting winding connected at both ends to both ends of the secondary winding of the second transformer whereby the probe is brought to saturation in dependence upon the exciting oscillations to thus lower the impedance of the probe winding substantially to its own ohmic resistance value during saturation periods corresponding to peak voltage value of the pulses applied to the second transformer, and a measuring circuit connected to the collectors of both transistors, said measuring circuit supplying at its output terminals a differential voltage proportional to the difference between the saturating currents produced in the winding of said probe at each alteration of the exciting voltage applied to the terminals of said winding.

According to a feature of this invention, the polarization or bias voltage issued from the excitation alternating current generator is servoed or tied down to the mean value of the voltages coming to said means of the measuring circuit for detection of dissymmetry between pulses, so that to stabilize the operating point of the apparatus.

As compared to the magnetometers using the detection of the even harmonics, the magnetometer device according to the present invention includes several outstanding advantages, viz:

(a) It includes only a single saturable core as well as a single winding which is common to the exciting circuit and the measuring circuit, this resulting in a simpler technical realization;

(b) The presence of a single winding and core eliminates completely the conventional precautions relating to symmetry and balancing, which are to be taken in the two core magnetometers;

(c) The exciting winding impedance is not critical, this allowing an easy cable connection between the magnetometer circuit and the probe;

(d) Said differential output directly gives the information relating to the polarity and intensity of the superposed permanent field without adding a phase detector circuit;

(e) The feature according to which the apparatus of this invention operates in a permanent saturation mode eliminates the memory effects eventually following a high superposed permanent field;

(f) The servoing as aforementioned of the operating point allows to maintain a good response linearity of the apparatus irrespective of the variations of the supply voltages and of the temperature.

Moreover, this invention provides the application of the above-described circuit to the measure of magnetic field gradients by means of two core-mountings not requiring two distinct magnetometer circuits and using either the detection of the exciting frequency second harmonic, or feed-back circuits allowing to compensate the differential field at the level of the probes.

Other features and advantages of the present invention will be revealed in the following description given in an illustrative and by no means limitative manner with reference to the annexed drawings, in which:

FIGURE 1 schematically shows the cricuit of a magnetometer according to this invention.

FIGURES 2, 3, 6 and 7 are curves for explaining the operation of this magnetometer.

FIGURE 4 represents schematically a device for measuring magnetic field gradients according to this invention.

FIGURE 5 shows an alternative embodiment of a magnetometer using the counter reaction.

FIGURE 8 shows schematically a gradient measuring device according to this invention.

Figure 1:
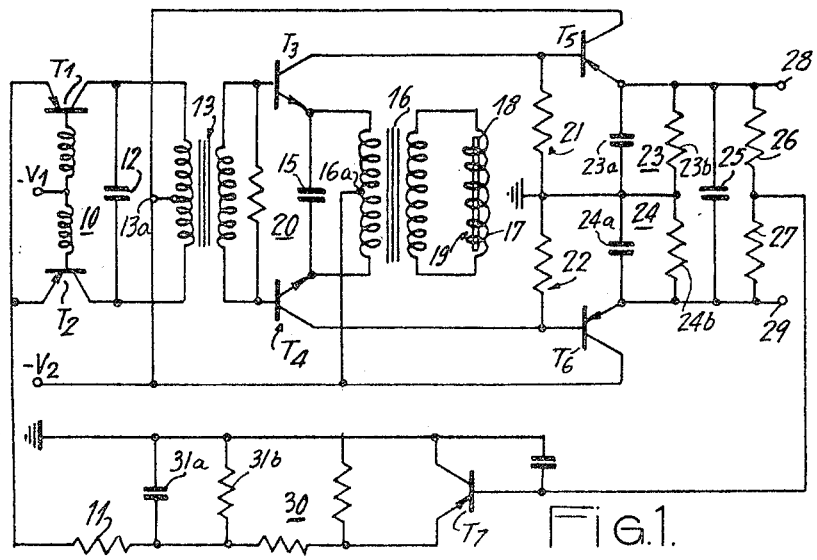

There can be seen in FIG. 1 a symmetrical-type alternating current generator 10, i.e. comprising two transistors T1 and T2, the bases of which are connected to a negative voltage source $-V_1$ whereby an A.C. voltage is produced which is symmetrical with respect to $V_1$. The emitters of said transistors are biased relatively to said bases by a voltage which may be constant, but preferably as shown in FIG. 1 by a variable voltage issuing from a resistor 11 connected in a servoing circuit 30 hereinafter described. The collectors of the transistors T1 and T2 are connected to a tuned circuit including a condenser 12 and the primary winding of a transformer 13 whereby a current having an audio frequency, for example in the order of 5000 cycles is produced. Further, the primary winding has a median tap 13a supplied with a negative voltage $-V_2$. The terminals of the secondary winding of the transformer 13 are respectively connected to the bases of transistors T3 and T4 which are parts of a symmetric impedance matching circuit 20 acting as amplifier for the alterations coming from the generator 10 and having a low apparent internal resistance, for example in the order of one ohm, and which includes a tuned circuit comprising a condenser 15 and the primary winding of a transformer 16, having a median tap 16a connected to the voltage $-V_2$. At the terminals of the secondary winding of the transformer 16 is connected an exciting winding 17 which surrounds a magnetic core 18, made from a high permeability material, of a probe 19. The collectors of transistors T3 and T4 are respectively connected to the base of two supplementary transistors T5, T6 of a measuring circuit. The base of said transistors T5, T6 are grounded by the resistors 21 and 22. In the circuit of the transistor emitters two integrating circuits 23 and 24 are provided, for example of the RC type, i.e. comprising respectively condensers 23a, 24a and resistors 23b and 24b, which are symmetrically grounded and both the emitter of transistors T5 and T6 are further connected by a condenser 25 and two series mounted equal resistors 26 and 27. The common terminal of resistors 26 and 27 is preferably connected to the input of a servoing circuit 30. The output voltage of the magnetometer is taken off between terminals 28 and 29 and this output voltage can be applied to an indicating measuring apparatus or to a telemeasuring channel (not shown).

The servoing circuit 30 includes essentially a transistor T7, the base of which is connected to the common terminal of resistors 26 and 27 and having its collector grounded, said transistor being followed by a RC network having a condenser 31a and a resistor 31b, said network being connected through a resistor 11 to the emitters of the transistors T1 and T2 of the generator 10. In this way the servoing circuit constitutes a feedback circuit for the generator 10.

This magnetometer operates as follows:

Generator 10 supplies a distortion-free sinusoidal current; the voltage issuing from the feedback circuit 30 and taken from resistor 11 causes each transistor T1 and T2 to conduct during a little more than a half-cycle, this avoiding the distortion resulting from a lowering of the coefficient $\beta$ at the low values of the current. The oscillations issuing from generator 10 are applied to the first stage transistors T3, T4 of the impedance matching circuit 20 which matches the generator-side and load-side impedances, said load being constituted by the probe 19. The audio frequency current is then injected by means of transformer 16 to the probe exciting winding 17, and it is adjusted at such a value that the magnetic core 18 is submitted to a magnetomotive force sufficient so that the saturation induction is largely reached. At the moment of saturation of the core the impedance of the winding 17 has a value which is considerably lower than formerly, and practically equal to the own ohmic value thereof.

Since the impedance matching circuit 20 comprising transistors T3 and T4 has been determined so as to have a very low internal resistance, the current variations generated at each half-cycle of the exciting current in the probe winding 17 are reproduced in the resistors 21 and 22 mounted in the collector circuits of said transistors to be applied to the respective bases of transistors T5 and T6.

Figures 2, 3:
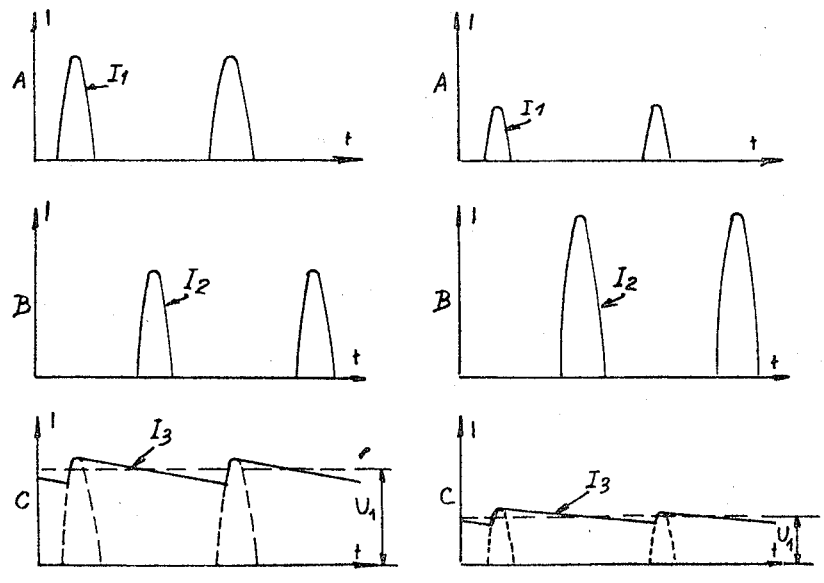

FIG. 2 shows, in terms of the time $t$, the current pulses $I_1$ and $I_2$ in the resistors 21 (FIG. 2A) and 22 (FIG. 2B). In the measuring circuit the transistors T5 and T6 supplies a gain of current, and the integrating circuits 23 and 24 integrate the peak value of these current pulses. The current variations in the resistors 23b and 24b of circuits 23 and 24 are shown in FIGS. 2C and 2D by $I_3$ and $I_4$, respectively. At the output, appears a voltage $U_1$ between the terminal 28 and the ground, and a voltage $U_2$ between the terminal 29 and the ground.

In the absence of the superposed magnetic field, the currents $I_1$ and $I_2$ are equal and, consequently, the voltages $U_1$ and $U_2$ are also equal. Thus, the output voltage between the terminals 28 and 29 is null.

If a magnetic field is present, the component of said field along the core 18 axis is added to the alternating flux for one series of half-cycles of the exciting current, while it opposes to this flux for the other series of half-cycles. Consequently, the level from which the core saturation is reached is no more the same for each series of half-cycles, and this absence of symmetry results in a difference between the currents $I_1$ and $I_2$ in the resistors 21 and 22, as shown by the curves A and B in FIG. 3. The direction and amplitude of the difference between said currents is a function of the polarity and intensity of the external superposed field. This results in an unbalance between the charges of the condensers 23a and 24a of the integrating circuits 23 and 24 and in a difference between the integrating currents $I_3$ and $I_4$ which are represented in C and D, respectively, in FIG. 3. There is then taken between the output terminals 28 and 29 a differential voltage $U_1-U_2$, which characterizes the component of the external field along the probe axis, the direction and amplitude of this output voltage depending upon the polarity and amplitude of said component.

There has been shown hereinabove that the bias voltage of the emitters of the transistors T1 and T2 of generator 10 could be fixed, but it has been deemed preferable to servo said voltage to the mean value of the output voltages of said both integrating circuits 23 and 24. To this end, the mean voltage $$\frac{U_1+U_2}{2}$$

relatively to the ground, existing at the common terminal of the resistors 26 and 27, is applied to the servoing circuit 30 which, since it controls the bias of the transistors T1 and T2 of generator 10, operates so as to stabilize the output voltage thereof and to keep for the magnetometer a good responsive linearity, irrespective of the variations of the supply voltages and of the temperature. The RC network 31a, 31b is so dimensioned as to provide a time constant suitable for the servoing.

The magnetometer just described may be also applied to the measure of a magnetic field gradient. Such a measuring device derived from the preceding magnetometer is schematically represented in FIG. 4 where like elements are given the same reference numbers as for the first above-described embodiment.

Two probes 19, 19' disposed at some distance one from the other are submitted to the action of a field $H$ for one of them, and of a field $H+\Delta H$ for the other. Both of said probes are electrically series mounted and are connected to an electronic device like the one shown in FIG. 1, through the transformer 16, the primary winding of which is connected to the emitter circuit of the transistors T3 and T4. At the terminals of the resistors 21 and 22, whose common point is grounded, a voltage is available which is proportional to the field mean value $$H+\frac{\Delta H}{2}$$

which as in the preceding case can be measured by means of the measuring circuit shown in FIG. 1. The circuit comprising the windings 17 and 17' of the respective probes and the secondary winding of the transformer 16 constitutes a bridge circuit which is fed by the generator 10. Between a central tap 16b, provided on the secondary winding of the transformer 16, and the common terminal 17a of windings 17, 17', there is thus taken a voltage whose component at the frequency which is twice that of the exciting frequency coming from generator 10 can be used in a device 32 including an amplifying filter followed by a demodulator receiving the signal from the exciting generator 10. The sign and amplitude of the output signal is then characteristic of the sign and amplitude of the considered field gradient ΔH.

The just described magnetometers are more particularly suitable for measuring mean fields or gradients, in the order of 10 to 1000μ Tesals/meter, either for the maximal deviation and according to the cross area of the core used and of the material constituting thereof or for field gradient of a magnitude comprised between 0.1 to 100μ Teslas per meter.

In those applications, where it is desired to measure lower fields, the circuit is modified according to this invention so as to increase the sensitivity of the device through a feed-back at the level of the probe. The corresponding circuit is shown in FIG. 5. The transistors T3 and T4 being arranged as above described, the collector circuit thereof includes further a load resistor 37 followed by an amplifier 33 tuned at the exciting frequency. The output of amplifier 33 is connected to one of the inputs of a phase detector 34, the other input of which receives from a winding 13b of the transformer 13 the reference voltage at the exciting frequency issued from the generator 10. The output voltage of the phase detector 34 is then applied in a feed-back mode through a resistor 35 to the terminals of a high capacity condenser 36 which is branched in the probe circuit between the secondary winding of transformer 16 and the winding 17. The output signal is taken at the terminals of the resistor 35.

In the absence of a superposed permanent field no dissymmetry exists in the core saturation for each half-cycle, and pulses having equal amplitudes (FIG. 6B) are taken at the resistor 37 terminals for each half-cycles of the exciting current $I_E$ (FIG. 6A). Said pulses generate at the output of said tuned amplifier 33 a sinusoidal voltage (FIG. 6C) which is no more at the exciting frequency but at a frequency which is twice the exciting frequency because a pulse is applied to the resistor 37 for each half-cycle of the generator 10. After a comparison in the phase detector 34, with the voltage coming from the winding 13b at the exciting frequency, there is obtained at the output of the phase detector a voltage shown in FIG. 6D, whose mean value is zero. It results that the feed-back current reintroduced in the probe circuit, is null as well as for the signal on resistor 35 in the absence of superposed field.

When an external field exists, the pulses at the terminals of resistor 37 have an unequal amplitude as shown in FIG. 7B, owing to the dissymmetrical saturation of the core for each series of half-cycles. There exists then at the output of the tuned amplifier 33 a signal having the exciting frequency (FIG. 7C), which is in phase, or in a phase opposition, with the signal $I_E$ of generator 10, this depending upon the component polarity of the superposed field along the axis of the probe core, and the detector 34 supplies a voltage, of which the amplitude and polarity is characteristic of the amplitude and polarity of said component. Such current, introduced in a feed-back manner at the terminals of the condenser 36, compensates for the most part the effect of the component of the superposed field and supplies to the resistor 35 terminals a voltage proportional to said component which can be applied to the input of a measuring or utilization circuit.

It should be noted that taking the reference voltage for the detector 34 from a separate secondary on the transformer 13 in impedance matching unit 20 enables one to obtain an output electrically isolated from the probe circuit, thus allowing a high dynamic impedance and an independence of the current with respect to the load.

and an independence of the current with respect to the measure of very low field gradients (from 1 manotesla/ meter) according to the schematic view of FIG. 8. Both probes 19 and 19', disposed at a known distance one from the other, are submitted to the fields H and $H+\Delta H$, respectively. Said probes, which are electrically series mounted, are connected to a first circuit like that in FIG. 5 by means of the transformer 16. A resistor 35, series connected with the condenser 36 of the feed-back circuit allows to measure the so compensated component of the field, said feed-back circuit being so dimensioned as to compensate for the most part the component of the field H along the axis of the probes.

A second feed-back circuit is branched in the diagonal of the bridge circuit formed by the windings 17, 17' and the middle tap 16b of the secondary winding of transformer 16. Said circuit includes a $\pi/2$ phase shifting filter 41, followed by an amplifier 43 tuned at the second harmonic of the exciting generator 10 frequency and whose output is connected to one input of a demodulator 44, the other input of which receives the exciting frequency signal of generator 10 by means of winding 13b. In the output circuit of this demodulator are provided a resistor 45 and two compensating windings 40 and 40' which are series connected one with the other and mounted in an opposed relationship around the respective cores of the probes 19 and 19'. Said second feed-back circuit is so dimensioned as to compensate for the most part the component of the field ΔH along the axis of the probes.

The operation of this circuit remains like the one above-described in relation to FIG. 5. The first feed-back circuit compensates the most part of the component of field H along the axis of both probes, the signal corresponding to said component being available at the terminals of resistor 35. In the second feed-back circuit, the voltage at twice the frequency of the exciting signal, resulting from the dissymmetrical saturation of the probes owing to the component of field ΔH, is first filtered and undergoes a $\pi/2$ phase shifting in the circuit 41, before being then amplified and demodulated respectively in the circuit 43 and the circuit 44. Demodulator 44 generates then a voltage at its output which is proportional to and has the same polarity as the ΔH field component. Said component is supplied to the compensating windings 40, 40' and allows to measure at the resistor 45 terminals the ΔH component so compensated by this second circuit.

Thus, there are available, at the terminals of the resistors 35 and 45, voltages respectively proportional to, and of the same polarity as, the considered field H and gradient of the field ΔH.

The present invention is not limited to the measures of magnetic fields in the magnetometers, but it can be also applied to the measures of D.C. currents in tore-type circuits having a high magnetic permeability, and more generally the so-called magnetic comparing circuits, where the measure of a magnitude is reduced to the measure of a magnetic field.

It is to be understood that many changes may be brought to this invention by those skilled in the art without going outside its scope as defined in the appended claims.

I claim:

1. An apparatus for measuring a magnetic field comprising:

an A.C. current generator producing exciting oscillations substantially at audio-frequency, a first transformer having its primary winding connected to said A.C. generator, a symmetric impedance matching circuit having at least two transistors the bases of said transistors being respectively connected one to each of the terminals of the secondary winding of said first transformer whereby said transistors are symmetrically biased independency upon each half-cycle of said exciting oscillations, a second transformer having the terminals of its primary winding connected one to each of the emitters of said transistors whereby successive current pulses corresponding to said exciting oscillations are applied to said second transformer a probe of saturable magnetic material surrounded by an excitation winding having said exciting winding connected across said secondary winding of said second transformer whereby said probe is brought to saturation in dependency upon said exciting oscillations, said probe winding thus having its impedance lowered substantially to its own ohmic resistance during saturation periods corresponding to peak voltage value of said pulses applied to said second transformer, and a measuring circuit connected to the collectors of both transistors, said measuring circuit supplying at its output terminals a differential voltage proportional to the difference between saturating currents produced in the winding of said probe at each alteration of the excitation voltage applied to the terminals of said winding.

2. An apparatus as set forth in claim 1 wherein said measuring circuit comprises a second pair of transistors, the collectors of which are connected together and whose bases, which are connected to the collectors of the transistors of the impedance matching circuit are themselves connected by two resistances in series, the emitters of the second pair of transistors being connected one to each of the output terminals of the measuring circuit, said output terminals being connected by two symmetrical integrating circuits which integrate the peak values of the saturating currents produced in said winding of said probe.

3. An apparatus as set forth in claim 2 comprising further two equal resistors connected together in series across said output terminals, and a conducting lead connected between said two resistors and to a servoing circuit connected to said generator whereby said generator is supplied with a voltage depending from the voltage between said output terminals thus stabilizing the output voltage of said generator.

4. An apparatus for measuring low magnetic fields as set forth in claim 1 wherein said measuring circuit comprises a load resistor connected to both the collectors of said two transistors of said impedance matching circuit, an amplifier connected across said resistor and tuned to the frequency of said A.C. generator, a phase detector connected to said amplified to recieve said pulses coming from said impedance matching circuit, and a supplemental secondary winding provided in said first transformer and connected to said phase detector whereby oscillations coming from said A.C. generator and sinusoidal voltage coming from said amplifier are thus compared to produce a voltage depending on the absence or preesnce of an external magnetic field.

5. An apparatus according to claim 4 comprising further a condenser interposed between said secondary winding of said second transformer and said winding of said probe, and a feed-back circuit including a resistor connecting said condenser with said phase detector whereby a component of an external magnetic field detected by said probe is for the most part compensated.

6. An apparatus as set forth in claim 1 comprising further a median tap provided in the secondary winding of said second transformer and a second probe having an exciting winding series connected with said winding of the first recited probe and an amplifying filter including a demodulator electrically connected between said median tap and between said two probe windings whereby a voltage signal coming from said demodulator is characteristic of the sign and amplitude of the difference between the external magnetic fields detected respectively by said two probes.

7. An apparatus as set forth in claim 6 and wherein said measuring circuit comprises a load resistor connected to both the collectors of said two transistors of said impedance matching circuit, an amplifier connected across said resistor and tuned the frequency of said A.C. generator, a phase detector connected to said amplifier to receive said pulses coming from said impedance matching circuit, a supplemental secondary winding provided in said first transformer and connected to said phase detector whereby oscillations coming from said A.C. generator and sinusoidal voltage coming from said amplifier are thus compared to produce a voltage depending on the absence or presence of an external magnetic field, said apparatus comprising further two compensating windings respectively mounted around said two probes, said compensating winding being series connected and electrically connected to said demodulator whereby a feed-back circuit for said two probes is formed thus compensating for the most part a component of difference between the external magnetic fields detected respectively by said two probes.

References Cited

UNITED STATES PATENTS 2,727,206  12/1955  Ryerson _____ 324—43

RUDOLPH V. ROLINEC, Primary Examiner

R. J. CORCORAN, Assistant Examiner